United States Patent
Jia

(10) Patent No.: US 8,047,071 B2
(45) Date of Patent: Nov. 1, 2011

(54) MULTIFUNCTIONAL ELECTRONIC DEVICE AND METHOD FOR USING THE SAME

(75) Inventor: Li-Jin Jia, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 51 days.

(21) Appl. No.: 12/616,322

(22) Filed: Nov. 11, 2009

(65) Prior Publication Data

US 2010/0275683 A1    Nov. 4, 2010

(30) Foreign Application Priority Data

Apr. 30, 2009  (CN) .......................... 2009 1 0302060

(51) Int. Cl.
*G01P 5/00*   (2006.01)
(52) U.S. Cl. .................................... 73/170.14
(58) Field of Classification Search .................. None
See application file for complete search history.

(56) References Cited

U.S. PATENT DOCUMENTS

| | | | | |
|---|---|---|---|---|
| 4,615,214 A * | 10/1986 | Burns | ......... | 73/170.15 |
| 5,191,800 A * | 3/1993 | Trombella | ......... | 73/861.74 |
| 6,684,174 B2 * | 1/2004 | Clark et al. | ......... | 702/138 |
| 7,254,493 B1 * | 8/2007 | Pelletier | ......... | 702/47 |
| 2002/0191802 A1 * | 12/2002 | Choe et al. | ......... | 381/92 |
| 2003/0163278 A1 * | 8/2003 | Clark et al. | ......... | 702/138 |

FOREIGN PATENT DOCUMENTS

CN    101650244 A    2/2010

* cited by examiner

*Primary Examiner* — Andre Allen
(74) *Attorney, Agent, or Firm* — Altis Law Group, Inc.

(57) ABSTRACT

A portable electronic device includes a housing, a processor unit received in the housing, and an anemometer unit mounted on the housing and electrically connected to the processor unit. The anemometer unit transforms pressure of wind blowing thereon into electronic signals, and the processor unit receives and processes the electronic signals to obtain wind pressures and velocities.

13 Claims, 3 Drawing Sheets

MULTIFUNCTIONAL ELECTRONIC DEVICE AND METHOD FOR USING THE SAME

BACKGROUND

1. Technical Field

The present disclosure relates to multifunctional portable electronic devices and methods for using the same, and particularly to a portable electronic device integrated with an anemometer and a method for using the same.

2. Description of Related Art

Anemometers are often used in researches, explorations, and scientific surveys to measure wind pressures and velocities. Generally, a conventional anemometer only has the function of measuring wind pressures and velocities, and thus carrying the anemometer may increase the burden of its user. If the anemometer is integrated with a more frequently used instrument, it may add value to be carried and used more easily.

Nowadays, portable electronic devices, such as mobile phones, digital cameras, and personal digital assistants (PDA), are widely used. The portable electronic devices are easy to be carried and can have many additional functions.

Therefore, there is room for improvement within the art.

BRIEF DESCRIPTION OF THE DRAWINGS

Many aspects of the present multifunctional electronic device and method for using the same can be better understood with reference to the following drawings. The components in the various drawings are not necessarily drawn to scale, the emphasis instead being placed upon clearly illustrating the principles of the present multifunctional electronic device and method for using the same. Moreover, in the drawings, like reference numerals designate corresponding parts throughout the figures.

DETAILED DESCRIPTION

Figure 1:
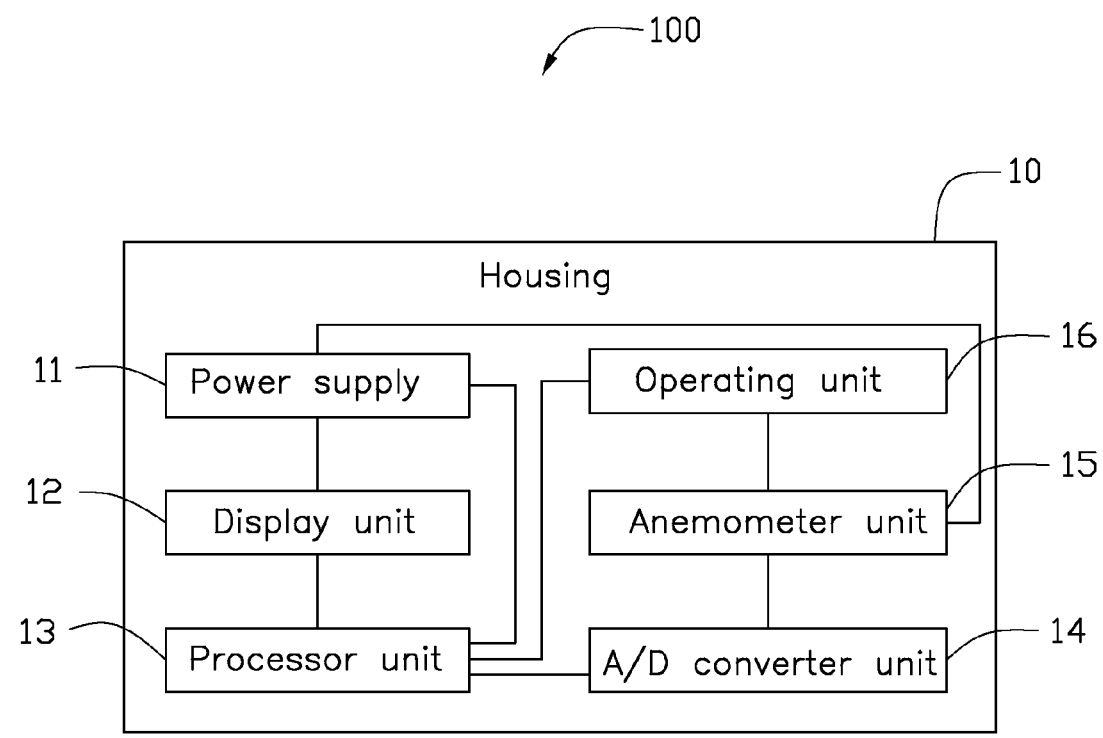
FIG. 1 is a block diagram of a multifunctional electronic device, according to an exemplary embodiment.

FIG. 1 shows a multifunctional electronic device 100 according to an exemplary embodiment. The multifunctional electronic device 100 can be a mobile phone, a digital camera, a personal digital assistant (PDA), etc. The electronic device 100 includes a housing 10, a power supply 11, a display unit 12, a processor unit 13, an analog/digital (A/D) converter unit 14, and an anemometer unit 15, and an operating unit 16. The power supply 11, the processor unit 13, and the A/D converter unit 14 are all received in the housing 10. The display unit 12, the anemometer unit 15, and the operating unit 16 are all mounted on the housing 10.

The power supply 11 can be a conventional battery of the portable electronic device 100. The display unit 12 can be a conventional display. The processor unit 13 can be a conventional central processing unit (CPU) of the portable electronic device 100. The power supply 11 is electrically connected to the display unit 12, the processor unit 13 and the anemometer unit 15 to supply working electric power to the display unit 12, the processor unit 13 and the anemometer unit 15. The display unit 12 is electrically connected to the processor unit 13, such that the processor unit 13 can control the display unit 12 to display images. The anemometer unit 15 is electrically connected to the A/D converter unit 14, and the A/D converter unit 14 is electrically connected to the processor unit 13. The operating unit 16 is a keypad of the portable electronic device 200. Additionally, the operating unit 16 can also be a touch pad or other conventional operating devices. The operating unit 16 is electrically connected to the processor unit 13 and the anemometer unit 15 for operation.

Figure 2:
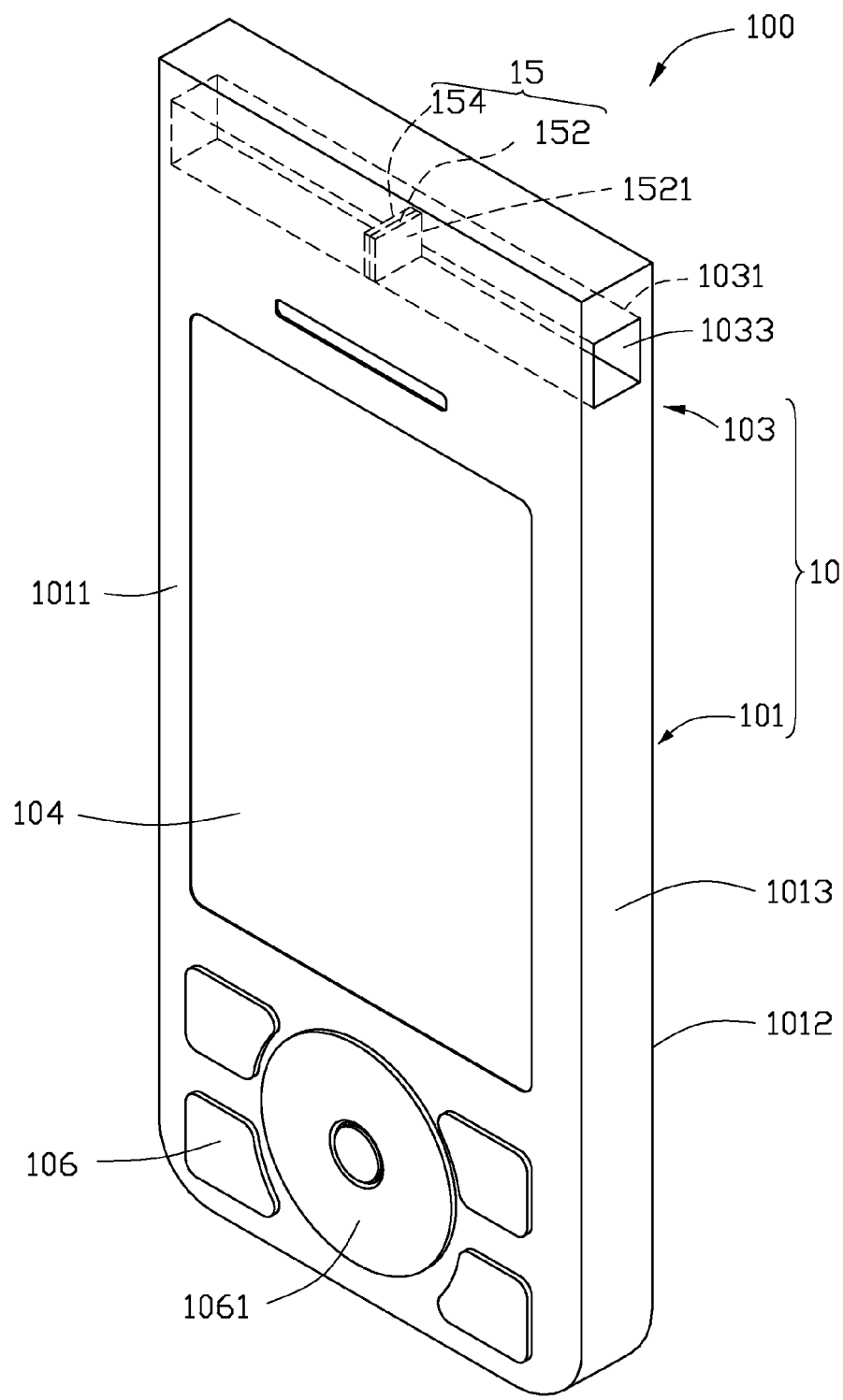
FIG. 2 is a schematic view of the multifunctional electronic device shown in FIG. 1.

Also referring to FIG. 2, the housing 10 includes a main body 101 and a measuring portion 103. The main body 101 has an operating surface 1011, a back surface 1012 parallel to the operating surface 1011, and four side surfaces 1013 perpendicular to the operating surface 1011 and the back 1012. The power supply 11, the processor unit 13, and the A/D converter unit 14 are all received in the main body 101. The display unit 12 and the operating unit 16 are mounted on the operating surface 1011 to be viewed and operated.

The measuring portion 103 is formed on an end of the main body 101, and can be integrated with the end. The measuring portion 103 defines a measuring hole 1031 therethrough, thereby respectively forming two corresponding openings 1033 on two opposite side surfaces 1013. The anemometer unit 15 is received in the measuring hole 1031.

The anemometer unit 15 includes a substrate 152 and a strain gage 154. The substrate 152 is a planar sheet made of elastic materials and has two opposite and parallel planar measuring surfaces 1521. The substrate 152 is positioned to be substantially perpendicular to the axis of the measuring hole 1031. The strain gage 154 can be a conventional strain gage having a shape and a size similar to the substrate 152. The strain gage 154 is attached to either one of the two measuring surfaces 1521, and is positioned parallel to the two measuring surfaces 1521. The strain gage 154 is electrically connected to the A/D converter unit 14.

Figure 3:
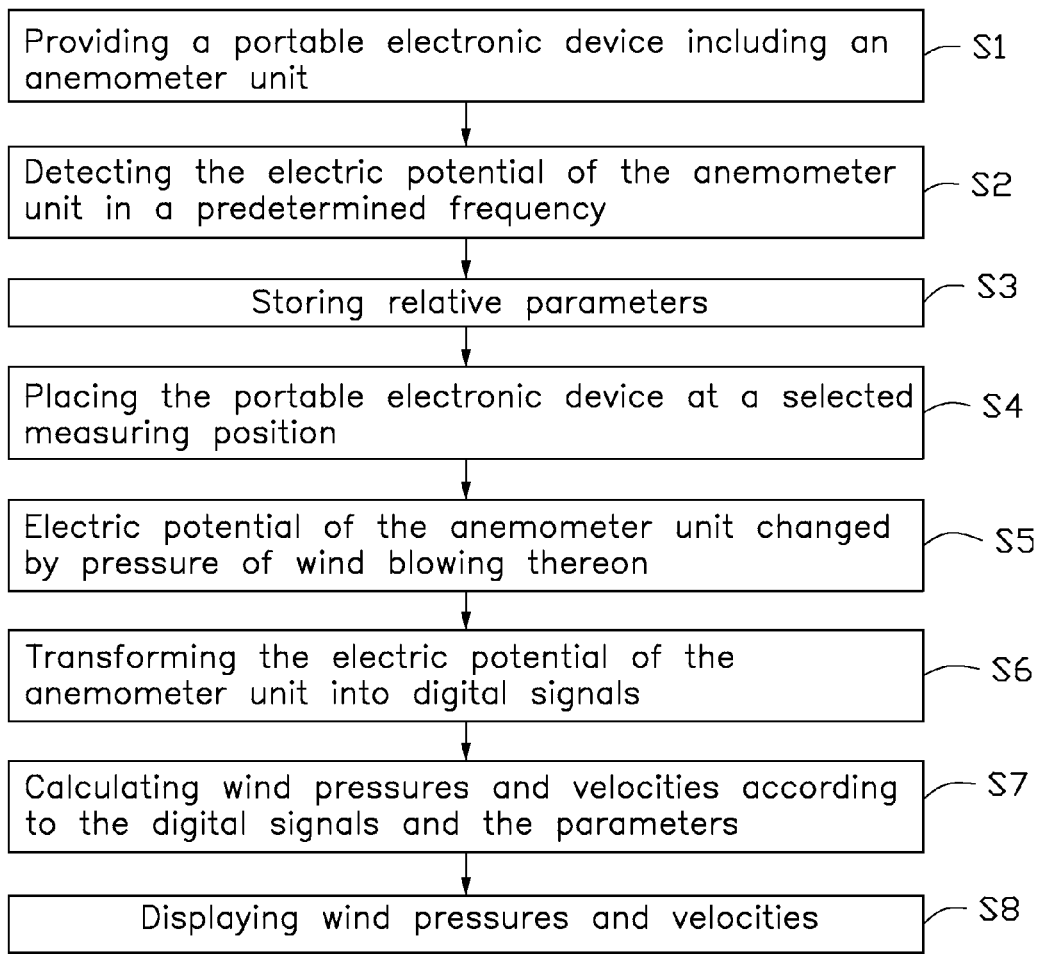
FIG. 3 is a flow chart of a method for using the multifunctional electronic device shown in FIG. 1.

The portable electronic device 100 has a conventional working mode and a wind pressures and velocities measuring mode. In the conventional working mode, the anemometer unit 15 is switched off (e.g., by operation on the operating unit 16) and does not generate any electronic signals. In the wind pressures and velocities measuring mode, the anemometer unit 15 is activated (e.g., by operation on the operating unit 16) and can generate electronic signals according to either or both of wind pressures and velocities. The electronic signals are transmitted to the processor unit 13 by the A/D converter unit 14, and the processor unit 13 can calculate the wind pressures and velocities according to the electronic signals. Thus, the portable electronic device 100 can measure wind pressures and velocities. Also referring to FIG. 3, a method for using the portable electronic device 100 to measure wind pressures and velocities is provided. The method includes these following steps.

First, an aforementioned portable electronic device 100 is provided (Step S1), and is switched to the wind pressures and velocities measuring mode by operating the operating unit 16. Thus, the anemometer unit 15 is activated. An electric potential on the strain gage 154 is transformed into digital signals by the A/D converter unit 14 and is transmitted to the processor unit 13 in a predetermined detecting frequency. Therefore, the processor unit 13 detects the electric potential of the strain gage 154 according to the digital signals in the predetermined detecting frequency (Step S2). Wind pressures and velocities measuring parameters, such as the detecting frequency, the resistivity and the elastic modulus of the strain gage 154, and the areas of the strain gage 154 and the measuring surfaces 1521, are all stored in the processor unit 13 (Step S3).

Afterwards, the portable electronic device 100 is placed at a selected position for measuring the wind pressures and velocities (Step S4). Either one of the two openings 1033 is positioned windward, such that airflow of the wind enters the opening 1033 and substantially perpendicularly blows onto the strain gage 154 or the measuring surface 1521 opposite to the strain gage 154. Thus, the substrate 152 and the strain gage 154 are both bent by the pressure of the wind. When the strain gage 154 is bent, a resistance of the strain gage 154 is changed, and then an electric potential on the strain gage 154 is also changed (Step S5). The changed electric potential is transmitted to the A/D converter unit 14. The A/D converter unit 14 transforms the electric potential into digital signals and transmits the digital signals to the processor unit 13 (Step S6).

The processor unit 13 processes the digital signals corresponding to the changed electric potential of the strain gage 154 to calculate the wind pressure and velocity (step S7). Particularly, the processor unit 13 measures the changed electric potential of the strain gage 154 according to the digital signals, and calculates the shape change of the strain gage 154 according to the electric potential change and the resistivity of the strain gage 154. Thus, the processor unit 13 calculates the pressure on the strain gage 154 (i.e., the wind pressure) according to the shape change and the elastic modulus of the strain gage 154. Furthermore, the wind velocity can be calculated according to the wind pressure and the areas of the substrate 152 and the strain gage 154. Finally, the calculated wind pressure and velocity can be displayed by the display unit 12 (Step S8).

Additionally, in the above-mentioned Step S3, the relation between the electric potential of the strain gage 154, the shape of the strain gage 154, the pressure on the strain gage 154, and the velocity of wind blows onto the substrate 152 or the strain gage 154 can be calculated in advance, and the relative data are stored in the processor unit 13. Thus, in the Step S7, the processor unit 13 can directly obtain the wind pressure and velocity corresponding to the electric potential of the strain gage 154, and the calculation processes can be omitted.

The present portable electronic device 100 integrated with the anemometer unit 15 is easy to be carried and used. The users of the portable electronic device 100 need not carry an additional anemometer. Furthermore, the measuring hole 1031 can also be defined in other portions of the main body 101. If the strain gage 154 is elastic, the substrate 152 can also be omitted, and the strain gage 154 can be directly mounted on the housing 10 and received in the measuring hole 1031.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A portable electronic device having a function of a mobile phone, a digital camera, or a personal digital assistant (PDA), comprising:
    a housing;
    a processor unit received in the housing; and
    an anemometer unit mounted on the housing and electrically connected to the processor unit, wherein the anemometer unit includes a strain gage and an elastic substrate, both the strain gage and the elastic substrate mounted on the housing, the strain gage attached on the elastic substrate and electrically connected to the processor unit; the strain gage transforms a pressure of wind blowing thereon into electric potential changes, and the processor unit receives and processes the electric potential changes to obtain at least one of wind pressures and velocities.

2. The portable electronic device as claimed in claim 1, wherein the housing includes a measuring portion defining a measuring hole therethrough, and the anemometer unit is received in the measuring hole.

3. The portable electronic device as claimed in claim 1, wherein the strain gage and the substrate are both planar sheets positioned to be substantially perpendicular to the axis of the measuring hole.

4. The portable electronic device as claimed in claim 1, further comprising an analog/digital (A/D) converter unit connected between the strain gage and the processor unit, the A/D converter unit transforms the electric potential changes generated by the strain gage into digital signals and transmits the digital signals to the processor unit to be processed.

5. The portable electronic device as claimed in claim 1, further comprising an operating unit mounted on the housing and electrically connected to the processor unit and the anemometer.

6. A method for measuring at least one of wind pressures and velocities, comprising:
    providing a portable electronic device having a function of a mobile phone, a digital camera, or a personal digital assistant (PDA), and including an anemometer unit;
    storing relative parameters for calculating at least one of wind pressures and velocities in the portable electronic device;
    placing the portable electronic device at a selected measuring position;
    using the anemometer unit to transform pressure of wind blowing thereon into electronic signals; and
    calculating at least one of the wind pressures and velocities according to the electronic signals and the parameters.

7. The method as claimed in claim 6, further comprising transforming the electronic signals into digital signals.

8. The method as claimed in claim 6, wherein the anemometer includes a strain gage, and the strain gage is bent by the pressure of wind blowing thereon to transform the pressure of the wind blowing thereon into electronic signals.

9. The method as claimed in claim 8, wherein the parameters include the resistivity, the elastic modulus, and the area of the strain gage.

10. The method as claimed in claim 8, wherein the strain gage is attached on an elastic substrate, and the parameters further includes the area of the substrate.

11. The method as claimed in claim 6, further comprising a step of detecting the electric potential of the anemometer unit in a predetermined detecting frequency.

12. The method as claimed in claim 11, wherein the parameters include the detecting frequency.

13. The method as claimed in claim 6, further comprising a step of displaying the wind pressures and velocities by the portable electronic device.

\* \* \* \* \*